(12) United States Patent
Morrow et al.

(10) Patent No.: US 10,467,846 B2
(45) Date of Patent: *Nov. 5, 2019

(54) INTEGRATED DISPLAY AND INPUT SYSTEM

(71) Applicant: Bally Gaming, Inc., Las Vegas, NV (US)

(72) Inventors: James W. Morrow, Sparks, NV (US); Marvin A. Hein, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 671 days.

This patent is subject to a terminal disclaimer.

(21) Appl. No.: 14/885,556

(22) Filed: Oct. 16, 2015

(65) Prior Publication Data
US 2016/0035179 A1 Feb. 4, 2016

Related U.S. Application Data (63) Continuation of application No. 13/684,815, filed on Nov. 26, 2012, which is a continuation of application
(Continued)

(51) Int. Cl.
*A63F 13/00* (2014.01)
*G07F 17/32* (2006.01)
(Continued)

(52) U.S. Cl.
CPC ........ *G07F 17/3209* (2013.01); *G06F 3/0488* (2013.01); *G06Q 30/0641* (2013.01);
(Continued)

(58) Field of Classification Search
CPC ............................ G07F 17/3209; G06F 3/0488
See application file for complete search history.

(56) References Cited

U.S. PATENT DOCUMENTS 3,662,105 A 5/1972 Hurst et al.
4,324,401 A 4/1982 Stubben et al.
(Continued)

FOREIGN PATENT DOCUMENTS

EP 0 443 738 A2 8/1991
EP 0769769 4/1997
(Continued)

OTHER PUBLICATIONS

Guk, "Encyclopedia: IBM PC Hardware," St. Petersburg, Russia, 1999, pp. 731-732. (3 pages).
(Continued)

*Primary Examiner* — David L Lewis
*Assistant Examiner* — Eric M Thomas
(74) *Attorney, Agent, or Firm* — Seed IP Law Group LLP (57) ABSTRACT

A system is disclosed for integrating system functions with gaming functions via a display screen of a gaming device. The system includes a gaming interface in communication with at least a first processor and a systems interface in communication with at least a second processor. The gaming interface is incorporated within the display screen of the gaming device, displays wagering game content received from the first processor, and receives first inputs delivered to the first processor to perform the gaming functions associated with the wagering game content. The systems interface is incorporated within the display screen of the gaming device, displays non-gaming system content received from a system network via the second processor, and receives second inputs delivered to the system network via the second processor to perform the system functions.

20 Claims, 8 Drawing Sheets

Related U.S. Application Data

No. 09/967,221, filed on Sep. 28, 2001, now Pat. No. 8,342,935.

(51) Int. Cl.
  *G07F 17/00* (2006.01)
  *G06F 3/0488* (2013.01)
  *G06Q 30/06* (2012.01)

(52) U.S. Cl.
  CPC .......... *G07F 17/0014* (2013.01); *G07F 17/32* (2013.01); *G07F 17/3202* (2013.01); *G07F 17/323* (2013.01); *G07F 17/3204* (2013.01); *G07F 17/3227* (2013.01); *G07F 17/3241* (2013.01)

(56) References Cited

U.S. PATENT DOCUMENTS

| | | | |
|---|---|---|---|
| 4,448,419 A | 5/1984 | Telnaes | |
| 4,676,506 A | 6/1987 | Crouch | |
| 4,710,758 A | 12/1987 | Mussler et al. | |
| 4,710,873 A | 12/1987 | Breslow et al. | |
| 4,718,672 A | 1/1988 | Okada | |
| 4,766,541 A | 8/1988 | Bleich et al. | |
| 4,837,728 A | 6/1989 | Barrie et al. | |
| 4,890,833 A | 1/1990 | Lantz et al. | |
| 5,047,867 A | 9/1991 | Strubbe | |
| 5,123,649 A | 6/1992 | Tiberio | |
| 5,205,132 A | 4/1993 | Fu | |
| 5,259,613 A | 11/1993 | Marnell | |
| 5,283,559 A | 2/1994 | Kalendra et al. | |
| 5,332,219 A | 7/1994 | Marnell, II et al. | |
| 5,342,047 A | 8/1994 | Heidel | |
| 5,357,604 A | 10/1994 | San et al. | |
| 5,412,404 A | 5/1995 | Candy | |
| 5,429,361 A * | 7/1995 | Raven .................. G07F 9/08 463/25 | |
| 5,450,938 A | 9/1995 | Rademacher | |
| 5,575,717 A | 11/1996 | Houriet, Jr. et al. | |
| 5,605,506 A | 2/1997 | Hoorn et al. | |
| 5,655,961 A | 8/1997 | Acres et al. | |
| 5,664,999 A | 9/1997 | Kurihara | |
| 5,680,533 A | 10/1997 | Yamato et al. | |
| 5,702,304 A | 12/1997 | Acres et al. | |
| 5,707,288 A | 1/1998 | Stephens | |
| 5,714,981 A | 2/1998 | Scott-Jackson et al. | |
| 5,725,428 A | 3/1998 | Achmüller | |
| 5,741,183 A | 4/1998 | Acres et al. | |
| 5,752,882 A | 5/1998 | Acres et al. | |
| 5,755,621 A * | 5/1998 | Marks .................. A63F 13/12 273/292 | |
| 5,759,102 A | 6/1998 | Pease et al. | |
| 5,766,074 A | 6/1998 | Cannon et al. | |
| 5,769,716 A | 6/1998 | Saffari et al. | |
| 5,770,533 A | 6/1998 | Franchi | |
| 5,779,545 A | 7/1998 | Berg et al. | |
| 5,796,389 A | 8/1998 | Bertram et al. | |
| 5,809,482 A | 9/1998 | Strisower | |
| 5,816,918 A | 10/1998 | Kelly et al. | |
| 5,820,459 A | 10/1998 | Acres et al. | |
| 5,833,536 A | 11/1998 | Davids et al. | |
| 5,833,540 A | 11/1998 | Miodunski et al. | |
| 5,836,817 A | 11/1998 | Acres et al. | |
| 5,851,148 A | 12/1998 | Brune et al. | |
| 5,876,284 A | 3/1999 | Acres et al. | |
| 5,885,158 A | 3/1999 | Torango et al. | |
| 5,919,091 A | 7/1999 | Bell et al. | |
| 5,935,002 A | 8/1999 | Falciglia | |
| 5,935,003 A | 8/1999 | Stephens et al. | |
| 5,951,397 A | 9/1999 | Dickinson | |
| 5,965,003 A | 10/1999 | Ozawa et al. | |
| 5,967,896 A | 10/1999 | Jorasch et al. | |
| 5,971,271 A | 10/1999 | Wynn et al. | |
| 5,971,849 A | 10/1999 | Falciglia | |
| 5,984,779 A | 11/1999 | Bridgeman et al. | |
| 6,003,013 A | 12/1999 | Boushy et al. | |
| 6,008,784 A | 12/1999 | Acres et al. | |
| 6,010,404 A | 1/2000 | Walker et al. | |
| 6,015,346 A | 1/2000 | Bennett | |
| 6,039,648 A | 3/2000 | Guinn et al. | |
| 6,068,552 A | 5/2000 | Walker et al. | |
| 6,077,163 A | 6/2000 | Walker et al. | |
| 6,083,105 A | 7/2000 | Ronin et al. | |
| 6,093,100 A | 7/2000 | Singer et al. | |
| 6,102,394 A | 8/2000 | Wurz et al. | |
| 6,102,798 A | 8/2000 | Bennett | |
| 6,110,041 A | 8/2000 | Walker et al. | |
| 6,113,495 A | 9/2000 | Walker et al. | |
| 6,115,036 A | 9/2000 | Yamato et al. | |
| 6,132,363 A | 10/2000 | Freed et al. | |
| 6,135,884 A | 10/2000 | Hedrick et al. | |
| 6,146,276 A | 11/2000 | Okuniewicz | |
| 6,159,097 A | 12/2000 | Gura | |
| 6,162,122 A | 12/2000 | Acres et al. | |
| 6,238,288 B1 * | 5/2001 | Walker .................. G06Q 30/02 273/138.1 | |
| 6,244,958 B1 | 6/2001 | Acres | |
| 6,253,119 B1 | 7/2001 | Dabrowski | |
| 6,254,483 B1 | 7/2001 | Acres | |
| 6,257,981 B1 | 7/2001 | Acres et al. | |
| 6,263,258 B1 | 7/2001 | Dabrowski | |
| 6,264,561 B1 | 7/2001 | Saffari et al. | |
| 6,280,328 B1 | 8/2001 | Holch et al. | |
| 6,292,171 B1 | 9/2001 | Fu et al. | |
| 6,293,866 B1 | 9/2001 | Walker et al. | |
| 6,302,790 B1 | 10/2001 | Brossard | |
| 6,312,333 B1 | 11/2001 | Acres | |
| 6,319,125 B1 | 11/2001 | Acres | |
| 6,364,768 B1 | 4/2002 | Acres et al. | |
| 6,371,852 B1 | 4/2002 | Acres | |
| 6,375,567 B1 | 4/2002 | Acres | |
| 6,375,569 B1 | 4/2002 | Acres | |
| 6,379,246 B1 | 4/2002 | Dabrowski | |
| 6,431,983 B2 | 8/2002 | Acres | |
| 6,439,996 B2 | 8/2002 | LeMay et al. | |
| RE37,885 E | 10/2002 | Acres et al. | |
| 6,511,376 B2 | 1/2003 | Walker et al. | |
| 6,511,377 B1 | 1/2003 | Weiss | |
| 6,565,434 B1 | 5/2003 | Acres | |
| 6,598,788 B1 | 7/2003 | Dabrowski | |
| 6,607,441 B1 | 8/2003 | Acres | |
| 6,712,697 B2 | 3/2004 | Acres | |
| 6,712,698 B2 | 3/2004 | Paulsen et al. | |
| 6,722,985 B2 | 4/2004 | Criss-Puszkiewicz et al. | |
| 6,800,030 B2 | 10/2004 | Acres | |
| 6,832,958 B2 | 12/2004 | Acres et al. | |
| 6,840,860 B1 | 1/2005 | Okuniewicz | |
| 6,910,964 B2 | 6/2005 | Acres | |
| RE38,812 E | 10/2005 | Acres et al. | |
| D531,333 S | 10/2006 | Acres et al. | |
| 7,335,106 B2 | 2/2008 | Johnson | |
| 7,520,810 B2 | 4/2009 | Dabrowski | |
| 7,520,819 B2 | 4/2009 | Dabrowski | |
| 7,749,081 B1 | 7/2010 | Acres | |
| 7,867,095 B2 | 1/2011 | Mattice et al. | |
| 7,871,325 B2 | 1/2011 | Okuniewicz | |
| 7,922,577 B2 | 4/2011 | Okuniewicz | |
| 8,029,364 B2 | 10/2011 | Loose et al. | |
| 8,083,592 B2 | 12/2011 | Wells | |
| 8,088,009 B2 | 1/2012 | Finnimore et al. | |
| 8,088,014 B2 | 1/2012 | Wells | |
| 8,113,956 B2 | 2/2012 | Finnimore et al. | |
| 8,133,102 B2 | 3/2012 | Dabrowski | |
| 8,241,119 B2 | 8/2012 | Wells | |
| 8,241,123 B2 | 8/2012 | Kelly et al. | |
| 8,282,480 B2 | 10/2012 | Wells et al. | |
| 8,317,604 B2 | 11/2012 | Wells | |
| 8,323,111 B2 | 12/2012 | Finnimore et al. | |
| 8,336,697 B2 | 12/2012 | Wells | |
| 8,342,935 B1 | 1/2013 | Morrow et al. | |
| 8,371,937 B2 | 2/2013 | Wells | |
| 8,371,942 B2 | 2/2013 | Finnimore et al. | |
| 8,388,424 B2 | 3/2013 | Dabrowski | |

(56) References Cited

U.S. PATENT DOCUMENTS

| | | |
|---|---|---|
| 8,475,273 B2 | 7/2013 | Kelly et al. |
| 8,512,144 B2 | 8/2013 | Johnson et al. |
| 2001/0044337 A1* | 11/2001 | Rowe .................. A63F 13/12 463/29 |
| 2002/0116284 A1 | 8/2002 | Steelman et al. |
| 2002/0183105 A1* | 12/2002 | Cannon ................ G07F 17/32 463/16 |
| 2002/0193099 A1 | 12/2002 | Paulsen |
| 2003/0032474 A1 | 2/2003 | Kaminkow |
| 2007/0243925 A1 | 10/2007 | LeMay et al. |
| 2007/0243934 A1 | 10/2007 | Little et al. |
| 2008/0009344 A1 | 1/2008 | Graham et al. |
| 2008/0161107 A1 | 7/2008 | Johnson |
| 2009/0098943 A1 | 4/2009 | Weber et al. |
| 2009/0104954 A1 | 4/2009 | Weber et al. |
| 2009/0233705 A1 | 9/2009 | LeMay et al. |
| 2011/0195792 A1 | 8/2011 | Wells et al. |
| 2011/0263325 A1 | 10/2011 | Atkinson |
| 2012/0108338 A1 | 5/2012 | Wells et al. |
| 2012/0122560 A1 | 5/2012 | Loose et al. |
| 2013/0072310 A1 | 3/2013 | Wells |

FOREIGN PATENT DOCUMENTS

| | | |
|---|---|---|
| EP | 0 915 437 A1 | 5/1999 |
| EP | 0 919 965 A2 | 6/1999 |
| EP | 0 961 213 A2 | 12/1999 |
| WO | 95/30944 A2 | 11/1995 |
| WO | WO9712315 | 4/1997 |
| WO | 97/38366 A1 | 10/1997 |
| WO | 98/47115 A1 | 10/1998 |

OTHER PUBLICATIONS

Figurov, "IBM PC: For Use," Moscow, Russia, 1977, pp. 57. (2 pages).

* cited by examiner

INTEGRATED DISPLAY AND INPUT SYSTEM

RELATED APPLICATIONS

This application is a continuation of U.S. patent application Ser. No. 13/684,815, filed Nov. 26, 2012, entitled "Integrated Display And Input System," which is a continuation of U.S. patent application Ser. No. 09/967,221, filed Sep. 28, 2001, entitled "Integrated Display And Input System," which are both hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates generally to a gaming system that incorporates access to player services and, more particularly, to a system and methodology for integrating gaming functions and system functions on a gaming display screen of a gaming device.

BACKGROUND

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention to the gaming machines has been to provide players with access to gambling related information. By attaching a small electronic display to the gaming device, gambling related information, as well as news and advertisements can be sent to the player. The gambling related information may include, for example, information on sports betting and betting options for those sporting events. Additionally, the gambling related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable for the player to be provided with interactive access to the above information. This type of interactivity would allow players significantly more flexibility to make use of the above described information. The gambling related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

Additionally, it would be highly advantageous to allow casino employees to be able to obtain system information from gaming machines in the most efficient manner possible. Current attempts to provided employee access to system information have involved attaching system components to the gaming machines. However, these attempts have also proved to be extremely limited in the functionality and capabilities that they can provide. It would be desirable to allow employees simple and easy access to system information directly from the gaming devices themselves, in order to increase the efficiency of system maintenance and support.

As stated above, attempts to distribute gambling related information and advertisements to players, and system maintenance information to employees, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Accordingly, those skilled in the art have long recognized the need for a system that is capable of integrating expanded service and systems capabilities with the more traditional function of a gaming device.

SUMMARY

Briefly, and in general terms, the disclosed embodiments resolve the above and other problems by providing a system for integrating system functions with gaming functions via a display screen of a gaming device. In this way, a more flexible, efficient, and interactive display and input system is provided.

More particularly, the system includes a gaming interface in communication with at least a first processor and a systems interface in communication with at least a second processor. The gaming interface is incorporated within the display screen of the gaming device, displays wagering game content received from the first processor, and receives first inputs delivered to the first processor to perform the gaming functions associated with the wagering game content. The systems interface incorporated within the display screen of the gaming device, displays non-gaming system content received from a system network via the second processor, and receives second inputs delivered to the system network via the second processor to perform the system functions.

In accordance with another embodiment, the system also includes a gaming interface in communication with at least a first processor and a systems interface in communication with at least a second processor. The gaming interface is incorporated within the display screen of the gaming device and displays a wagering game received from the first processor. The system enables a player to view and participate in the wagering game through the gaming interface. The systems interface is incorporated within the display screen of the gaming device and displays non-gaming system content received from a system network via the second processor. The systems interface also enables player input to be received by the system network

DETAILED DESCRIPTION OF THE DISCLOSED EMBODIMENTS

A disclosed embodiment of the display and input system is directed towards the integration of system functions with gaming functions on a video display screen of a gaming device. The display and input system provides enhanced player satisfaction and excitement, as well as improved gaming device reliability, interactivity, flexibility, security, and accountability. Referring now to the drawings, wherein like reference numerals denote like or corresponding parts throughout the drawings and, more particularly to FIG. 1, there is shown one embodiment of a display and input system 10.

Figure 1:
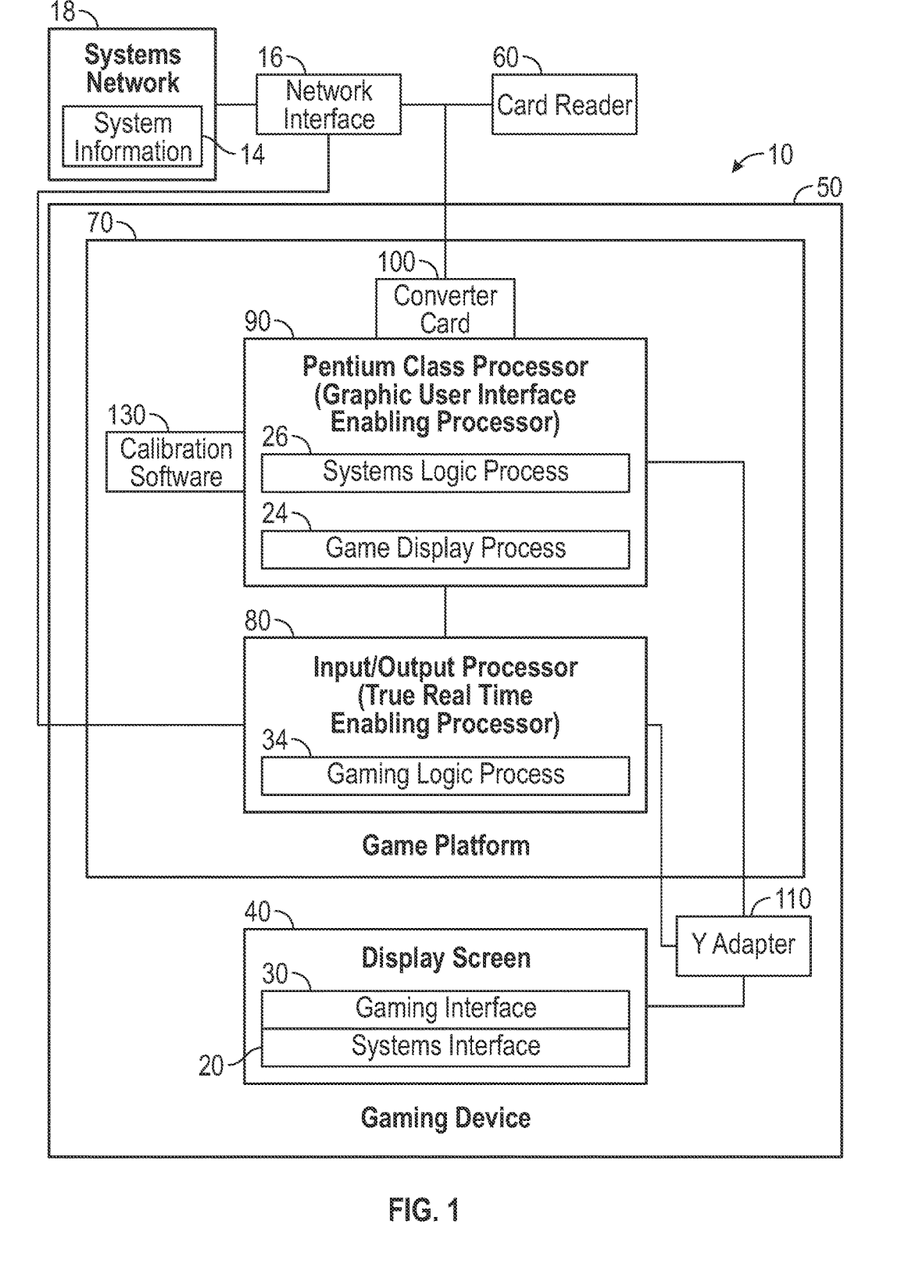
FIG. 1 illustrates a relational diagram of a display and input system, utilizing a two processor platform gaming device in conjunction with a gaming system.
Figure 2:
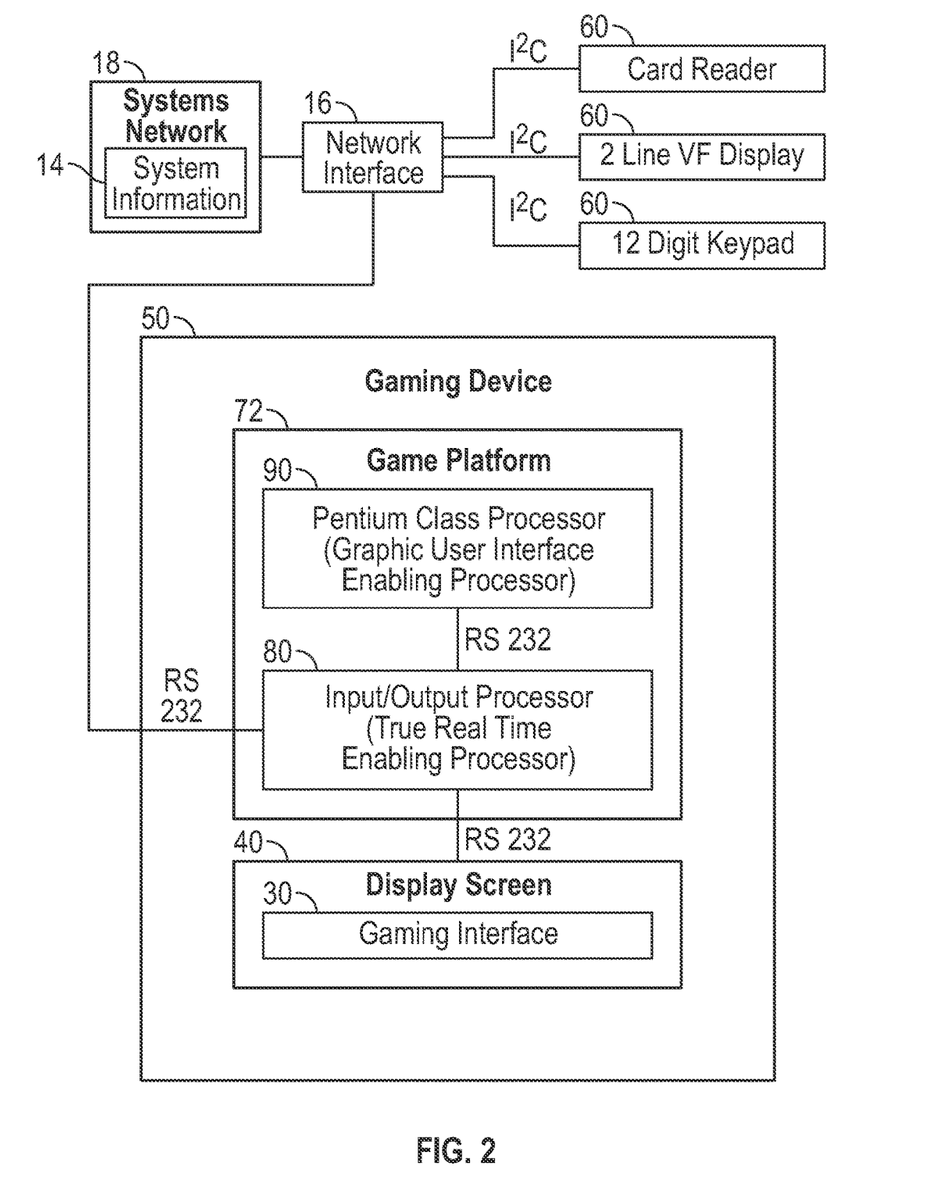
FIG. 2 illustrates a relational diagram of the two processor platform gaming device and gaming system of FIG. 1, without the display and input system.

Referring now to FIG. 1, a disclosed embodiment is a display and input system 10 for players and casino employees. The display and input system 10 provides an enhanced means for displaying service and system information 14 via a system network 18 to a player and/or to a casino employee. The display and input system 10 enables part or all of a video display screen 40 in a gaming device 50, which had previously been used only as a gaming interface 30, to be utilized as a systems interface 20 for data entry and retrieval of the service and system information 14. The systems interface 20 accesses service and system information 14 from the system network 18. This is a dramatic improvement over traditional system components (input/output peripherals) that have been used in the past to access service and system information 14 from the system network 18. As shown in FIG. 2, these traditional system components include 2-line, 20 character VF displays and 12-digit keypads. Referring again to FIG. 1, it should be noted that one disclosed embodiment of the display and input system 10, does not control game play itself (e.g., game play betting, game play flow, or game play operation). Rather, the display and input system 10 provides only a limited form of game play monitoring, indirectly, with respect to the monitoring of player points.

As shown in FIG. 2, current gaming devices utilize the video display screen 40 solely as a gaming interface 30 for the device 50. The gaming interface 30 provides access to the display screen 40 associated with game play where the player participates in gaming activity. However, in the embodiment as shown in FIG. 1, the display and input system 10 integrates both the systems interface 20 and the gaming interface 30 via the video display screen 40, which; again, was previously used only for game play via the gaming interface. In one embodiment, the systems interface 20 of the display and input system 10 includes a touchscreen keypad and display. In this manner, service and system information 14 from the system network 18 is displayed to players through the systems interface 20 within the display screen 40. Further, the systems interface 20 provides a player with direct interactive access to the service and system information 14 in the system network 18, by using the display screen 40 as a touchscreen input device. This type of systems interface 20 provides greater simplicity, flexibility, player excitement, interactivity, and developmental options than using traditional system components 60 that provide only limited service/system access, typically through codes or command lines.

Another embodiment display and input system 10 uses a game platform 70 as its foundation. The game platform 70 uses two separate processors connected by a serial line, e.g., RS-232. The first processor, referred to as the input/output processor 80 (IOP), contains no video or sound hardware. The IOP 80 is responsible for all hard real time processing requirements (e.g., approximately sub 200 milliseconds), which are typically hardware driven requirements. The IOP 80 contains all of the game logic 34, random number generators (RNG), host input/output (I/O), device I/O, and the core main and personality EPROMs. The term "mains," refers to the majority of the code that runs the physical hardware and peripherals related to the wagering game. The term "personalities" refers to code that contains the rules of the wagering game, which include by way of example only, and not by way of limitation, game odds, probabilities, winning symbols, and the like.

The second processor is a diskless, Pentium class PC-based processor 90. The processor 90 accesses a CD-ROM (read-only drive) that controls video and sound output. The graphics, sound files, presentation software, and basic operating system are stored on the CD-ROM. A modified BIOS chip, referred to as a BIOS+, provides typical PC boot functions, as well as verification and decryption algorithms. The Pentium class processor 90 is generally defined as a processor capable of supporting a graphic user interface (GUI) gaming environment. In other disclosed embodiments, a non-Pentium class (but, substantially equivalent) processor is utilized instead of the Pentium class processor 90. Nevertheless, it will be appreciated that this processor can be of any type including, by way of example only, and not by way of limitation, another non-Pentium Intel processor, Advanced Micro Devices (AMD) processor, Motorola processor, or the like.

A disclosed embodiment of the display and input system 10, enables the system components 60 to take advantage of the game platform 70, by enabling the system components 60 to communicate directly with the processor 90, which provides the functionality of a graphic user interface (GUI), instead of having to access service and system information 14 from the system network 18 through a Game Monitoring Unit (Network Interface Card). This communication between the system components 60 and the processor 90 enables the processor to display the service and system information 14 from the system network 18 through a systems interface 20 via the display screen 40. Moreover, the processor 90 accesses the service and system information 14 from the system network 18 and displays the information in the systems interface 20 without involving the game logic process 34 in the TOP gaming processor 80. Thus, in one embodiment, the gaming interface 30 is displayed on the display screen 40 by the game logic process 34 in the IOP 80, while the systems interface 20 is displayed on the display screen 40 by the systems logic process 26 in the processor 90.

In one disclosed embodiment, the processor 90 runs two processes: the game display process 24 and the systems logic process 26. The systems logic process 26 provides access to system information 14 on a system network 18 via the systems interface 20. The game display process 24 includes audio-visual capabilities necessary to generate a wagering game via the gaming interface 30. Typically, these two processes are kept separate due to regulatory concerns.

As described above, the game logic process 34, runs on the IOP 80. The IOP 80 runs the game logic process 34 that includes the game rules necessary to generate a wagering game via the gaming interface 30. Referring again to the Pentium class processor 90, the game display process 24 is the master process and the systems logic process 26 is the slave process. In response to a proper command, the game display process 24 relinquishes control of the video display screen 40 to the systems logic process 26. After the systems logic process 26 has completed its functions, the systems logic process then returns control of the display screen 40 to the game display process 24.

The display and input system 10 utilizes the video display screen 40 and game platform 70 to make casino services more accessible and friendly to casino patrons. In one embodiment of the display and input system 10, the hardware configuration of the game platform 70 employs an existing gaming communication systems network 18, thus decreasing implementation costs for the casino. A standard gaming network interface 16 to the systems network 18, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI bus (Enhanced Player Interface bus), and uses industry standard I$^2$C hardware and signaling. The network interface 16 (or equivalent system) also controls the flow of funds used with the gaming device 50 within a particular casino. By utilizing the display and input system 10, the gaming network interface 16 can be instructed to move funds between player's accounts and gaming devices by merely touching the display screen 40. In addition, many other more sophisticated commands and instructions may be provided. The display and input system 10 improves the player and casino employee interface to the gaming device 50, directly at the gaming device itself.

Another embodiment provides a mechanism for the EPI bus to input system information 14 into and to retrieve system information from the processor 90 of the game platform 70. This mechanism is, for example, an I$^2$C converter card 100. The I$^2$C converter card 100 has multi-master capabilities, i.e., the card is capable of participating as both a slave and as a master. This multi-master card 100 enables system information 14 (such as information input by a player into a systems interface 20 keyboard) to be sent from the Pentium class processor 90 to the slot system network 18. Likewise, the card 100 also enables system information 14 (such as display messages) to be sent from the systems network 18 to the processor 90 of the game platform 70 for viewing by the player through the systems interface 20.

Specifically, in one embodiment of the display and input system 10, the I$^2$C converter card 100 is added to the processor 90 of the game platform 70. This enables the game platform 70 to speak and understand the I$^2$C protocol message set, and thus, communicate directly with some of the system components 60 (i.e., the keypad and display). Accordingly, in some embodiments display and input system 10, the functionality of these system components 60 (the keypad and display) is integrated into a systems interface 20, and the external hardware of these system components 60 (the keypad and display) is eliminated. In another embodiment of the display and input system 10, a PC board is used to convert I$^2$C bus messages into a PC-acceptable form over a serial port. Thus, this embodiment would not require an I$^2$C converter card 100.

As shown in FIG. 2, system components 60 for casino patrons and casino employees on gaming devices 50 traditionally have been external devices that are attached to the gaming devices. These system components 60 usually include a card reader, a keypad, and a 2-line VF display for each machine. In traditional gaming devices, these system components 60 are small electronic components that are added to the machine and controlled by a network interface card (referred to hereinafter as a game monitoring unit (GMU)). These system components 60 communicate through the GMU to access service and system information 14 from the system network 18. This is in lieu of communicating through the game platform 70. Typically, these prior system components 60 (e.g., keypad, card reader, and display) communicate through the GMU using a defined I$^2$C protocol message set.

In one embodiment, the display and input system 10 (shown in FIG. 1) replaces the traditional 12-digit keypad and 2-line VF display system components 60 (shown in FIG. 2), which possess only limited functionality, with a systems interface 20 having a touchscreen keypad and video display, and that is incorporated into the video display screen 40 of the gaming device 50. In other embodiments, the systems interface 20 utilizes various other data input techniques commonly known in the art, instead of the touchscreen data entry. Thus, implementation of the display and input system 10 is an efficient, and highly beneficial, interchanging of parts that integrate the functionality of prior system components 60 into the systems interface 20, while eliminating the external hardware of those components which limited their potential utility.

In the embodiment described above, the card reader is retained as an external system component 60 and not integrated into the systems interface 20. Thus, the card reader system component 60 still communicates through the GMU in order to access service and system information 14 from the system network 18, instead of communicating through the game platform 70. This configuration limits the amount of information resident on an identification card (which the card reader system component 60 will scan) to only an identification number or code. However, in other embodiments, all of the system components 60 in the gaming device 50 are integrated into the systems interface 20. This enables communication directly through the game platform 70 to access service and system information 14 from the system network 18. As such, there is no need for additional assistance from the GMU.

In an earlier configuration of the game platform 72, as shown in FIG. 2, information input into the display screen 40 by a player is sent only to the IOP 80, and not to the Pentium class processor 90. This configuration is utilized in the earlier game platform 72 because the display screen 40 is used solely by the gaming interface 30 that is run by the game logic process 34 located in the IOP 80. Thus, the display and input system 10, as shown in FIG. 1, must also enable the processor 90 to "see" information that is input to the display screen 40. This is performed by a Y adapter 110 that is connected to the output of the display screen 40. The Y adapter 110 is a cable that routes the information from the display screen 40 to both the IOP 80 and the processor 90. The IOP 80 is generally in control of the display screen 40 via the gaming interface 30, however, when the screen focus shifts to the systems interface 20, the processor 90 assumes control of the display screen 40 using the Y adapter 110 so as to "see" touchscreen commands from the player via the systems interface 20.

Additionally, in the earlier game platform 72 configuration, as shown in FIG. 2, information sent to the display screen 40 comes solely from the IOP 80. The Pentium class processor 90 is not configured to control the display screen 40 in the earlier game platform 72 design. Thus, the display and input system 10, as shown in FIG. 1, also includes calibration software 130 that enables the Pentium class processor 90 to calibrate itself to the display screen 40. The calibration software 130 enables the processor 90 to also send information to the display screen 40 for viewing by the player via the systems interface 20.

Traditionally, the processor 90 employed in the game platform 70 has two on-board serial ports. Typically in the game platform 70, both Pentium on-board serial ports have been used. One serial port is used to communicate with the IOP 80, while the other serial port is dedicated to the Game Authentication Terminal (GAT) function. This port is used by gaming regulators in order to attach to a gaming device 50 and perform verification operations. In another embodiment of the display and input system 10, three serial ports are usually required, since the Pentium class processor 90 must also be connected to the display screen 40. Thus, in order to accommodate the third serial connection from the display screen 40 to the processor 90, a port expander card is added to the processor 90, in one disclosed embodiment. Alternatively, USB (Universal Serial Bus) can be used for such connections. The IOP 80 is connected to the network interface 16 by a serial line, e.g., RS-232, in both the earlier game platform 72 configuration (as shown in FIG. 2) and in the game platform 70 utilized in conjunction with the display and input system 10 (as shown in FIG. 1). Moreover, USB can be implemented for these connections, as well.

In another embodiment of the display and input system 10, the functions currently performed by the network interface 16 are included within the systems logic processes 26 that are run on the processor 90. In one disclosed embodiment, the EPI bus on the PC converter card 100 is still used to connect to any remaining system components 60, such as the card reader. Alternatively, USB can be used for such peripheral connections. However, in another embodiment, the functionality of all remaining system components 60, such as the card readers, is incorporated into the systems interface 20 run by the Pentium class processor 90. This configuration removes the need for the GMU.

In still another embodiment, the Pentium class processor 90 has control over the game logic process 34 and receives touchscreen data directly from the display screen 40. Moreover, in this embodiment, the IOP 80 is only responsible for hard real time tasks (sub 200 millisecond tasks) such as de-bouncing buttons, monitoring reel spins, time outs, and other generally hardware related tasks. Thus, in this embodiment, all game logic processes 34, game display processes 24, and systems logic processes 26 are performed by the Pentium class processor 90. This embodiment of the display and input system 10 also allows for game rules and personalities to be downloaded via the system network 18. Additionally, in this configuration the Y adapter 110 is not required, since only the Pentium class processor 90 need directly interact with the display screen 40.

In this embodiment, multiple processes remain on the processor 90. At a minimum, a game logic process 34 and a systems logic process 26 are included which communicate with one another over a well defined interface. Additionally, in this embodiment, the current system network 18 is replaced by an industry standard, such as 10/100 base T Ethernet running over Cat 5, 4 or 3. Thus, a standard 10/100 base T Ethernet card is added to the Pentium class processor 90 in this embodiment. In another aspect, the network employs TCP/IP, http, and XML messaging or a variant of XML. Nevertheless any suitable protocol may be used.

The display and input system 10 enables the game platform 70 to run a systems interface 20 on the display screen 40 of the gaming device 50 which previously had been only able to run a gaming interface 30. The systems interface 20 enables casino patrons and employees to access service and system information 14 from the system network 18 directly through the display screen 40 of the gaming device 50, and may include a touchscreen keypad and display. Integrating the gaming interface 30 and systems interface 20 together in the display screen 40 provides increased flexibility and functionality, while maintaining the game logic process 34 on the IOP 80 and the systems logic process 26 on the processor 90. Separating the game logic process 34 on the IOP 80 from the systems logic process 26 on the Pentium class processor 90 provides for increased security, as well as increased compatibility due to interchangeability.

Accordingly, changes can be made to the systems interface 20 (and remaining system components 60) or to the game logic process 34 without impacting one another. This allows independent development organizations to proceed separately, if desired, with one organization directed towards the game logic process 34 and the other organization directed towards the systems interface 20. Yet, when a player views the display screen 40 of the gaming device 50 that has incorporated the disclosed embodiments, the service and system information 14 accessed through the processor 90 appears to be integrated with game logic process 34 that is being run in the IOP 80, just as the systems interface 20 and the gaming interface 30 are integrated in the display screen 40.

A disclosed embodiment of the display and input system 10 provides access to service and system information 14 from the system network 18 that is of interest to the player or the casino employee. Significantly, the display and input system 10 is game independent. In other words, since the display and input system 10 does not affect or control game play, the system 10 can be interchangeably utilized in conjunction with most any game, while still providing access to service and system information 14 from the system network 18 for the casino patron and employee provided that the game platform 70 (or game platform with equivalent functionality) is utilized.

The advent of the game platform 70 created an environment that was ripe for the development of the display and input system 10, incorporating the systems interface 20 with a keypad and display into the video display screen 40 of a gaming device 50. Since the game platform 70 includes a Pentium class processor 90 that employs a GUI (e.g., "Windows environment," or alternatively a LINUX environment or a JAVA applet), this game platform enables multiple applications to be run simultaneously (providing many potential advantages for use within a gaming environment). Thus, the display and input system 10 enables an area on the display screen 40 to be allocated as a systems interface 20 in order to show player messages that would previously have had to be displayed on a separate display device (e.g., a 2-line VF display device); such device being attached to the gaming device 50. In another embodiment, a touchscreen button and/or an identification card are used by the player to activate a full screen systems interface 20 allowing access to system functions such as cashless withdraw, balance requests, system requests, points redemption, and the like. By having the entire display screen 40 accessible for the systems interface 20, the usefulness of the interface for the casino patrons (and employees) is dramatically improved.

In one embodiment, the display and input system 10 identifies the player or employee using a traditional "dumb" identification card (i.e., a card with no memory or other type of updating functionality). The display and input system 10 does not use the identification card to record winnings, losses, game plays, or any other type of information. Instead, the identification card contains only a unique player or employee identification number that is permanently and unalterably embedded within the card. All other player information (winnings, losses, game plays, etc.) is stored and accessed on a back-end server, as referenced by the number from the identification card. It will be appreciated, however, that other types of cards may be used, e.g., smart cards, but the enhanced processing and memory capabilities are not required to practice the disclosed embodiments.

Figure 3:
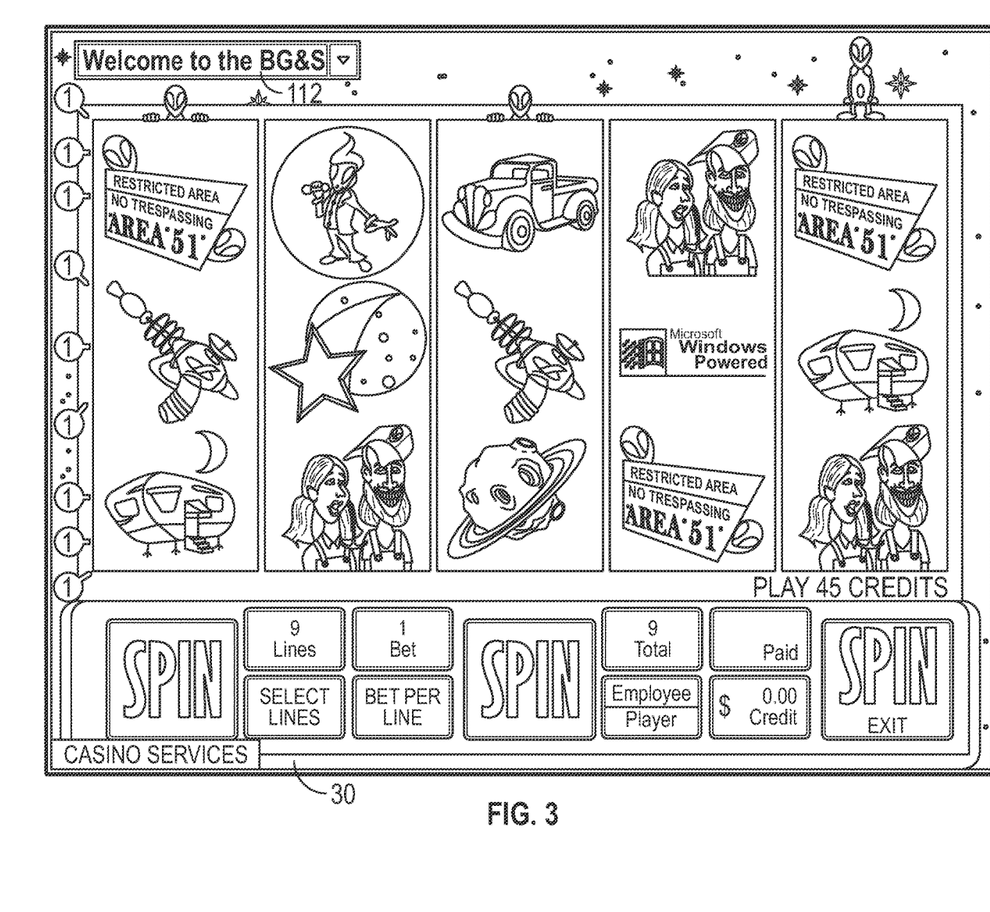
FIG. 3 illustrates a front view of a display screen of a gaming device, while a gaming interface is activated for game play in conjunction with a small systems interface window displaying scrolling text.
Figure 4:
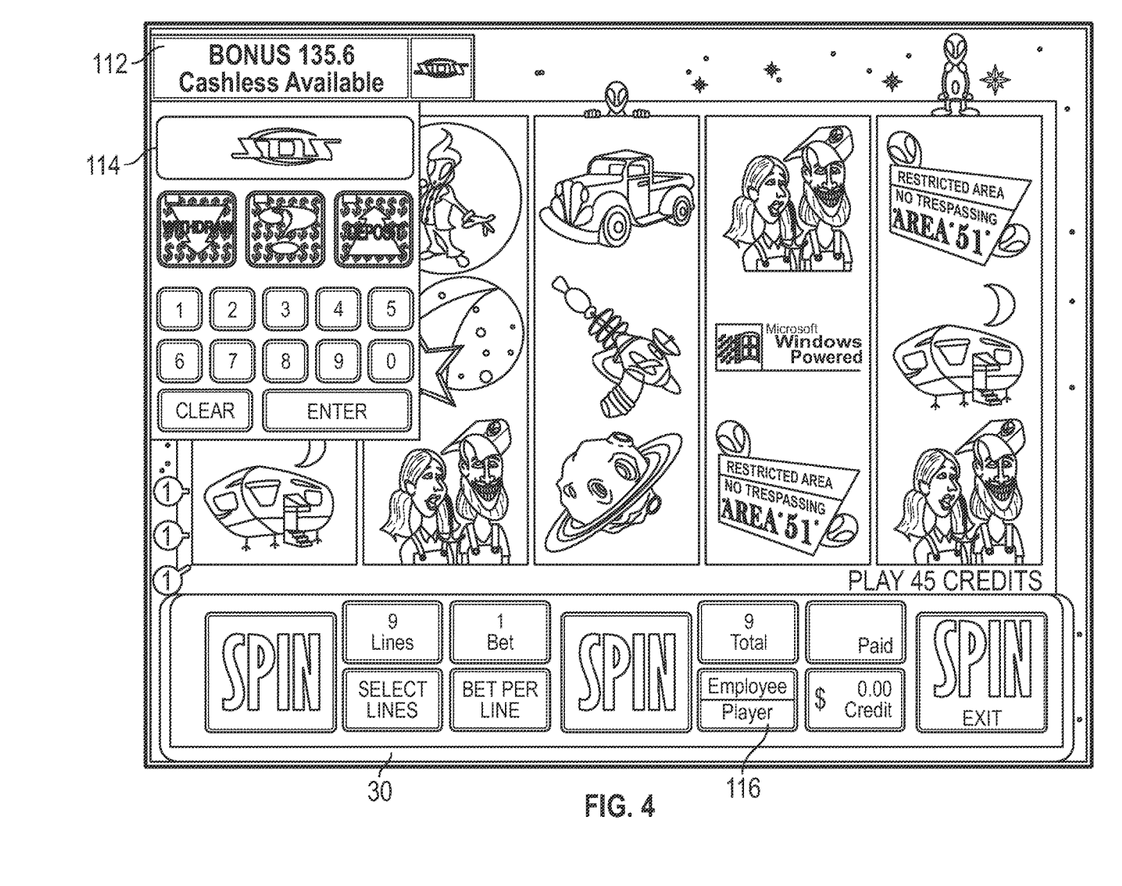
FIG. 4 illustrates a front view of the display screen of the gaming device in FIG. 3, while a gaming interface is activated for game play in conjunction with a partial screen systems interface displaying a 12 digit keypad.

In one embodiment of the display and input system 10, as shown in FIG. 3, a small message area 112 on the display screen 40 is reserved for use by the systems interface 20 during game play. In this specific embodiment, the systems interface 20 scrolls system messages to the player within this small message area 112 of the display screen 40, while the remainder of the display screen is used by gaming interface 30. The scrolling message can be set at any desired length. This message might state, for example, "Welcome to Harrah's Las Vegas! You have 1200 bonus points. Would you like to make a hotel or dinner reservation?" Additionally, by inserting a player identification card into a card reader and/or selecting a player services button 114, a systems interface keypad 116 is activated for additional player services functionality, as shown in FIG. 4.

Figure 5:
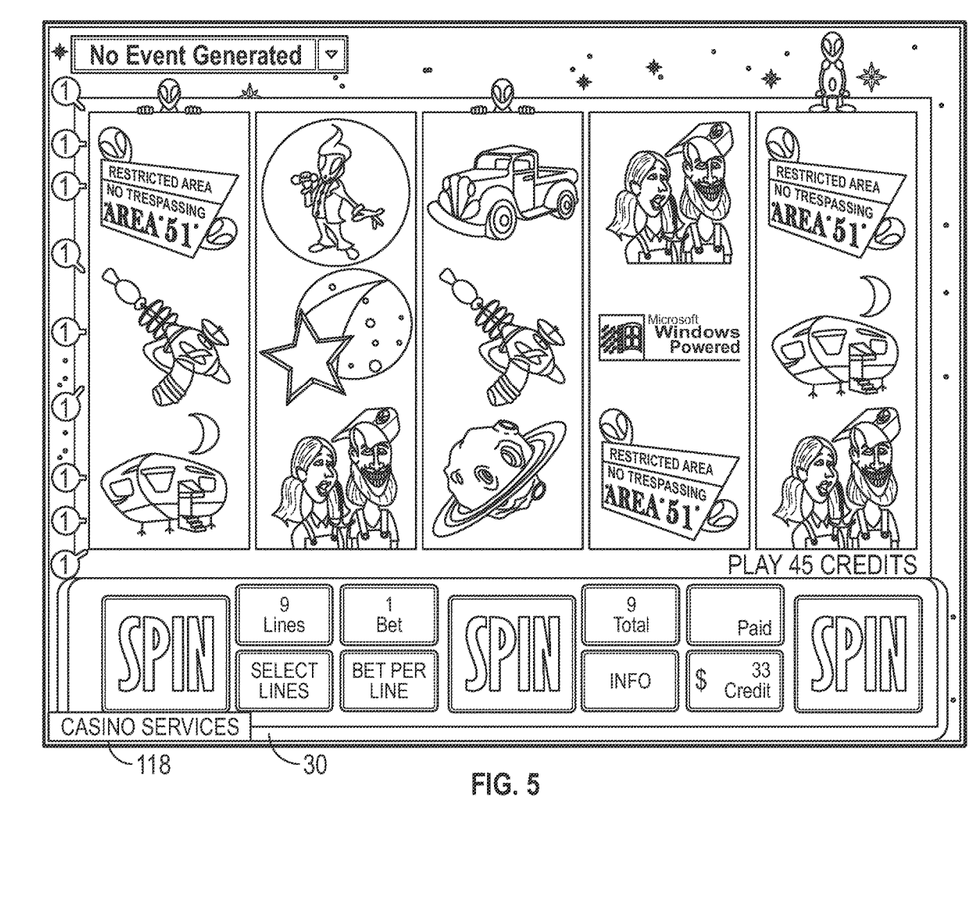
FIG. 5 illustrates a front view of the display screen of a gaming device, while a gaming interface is activated.
Figure 6:
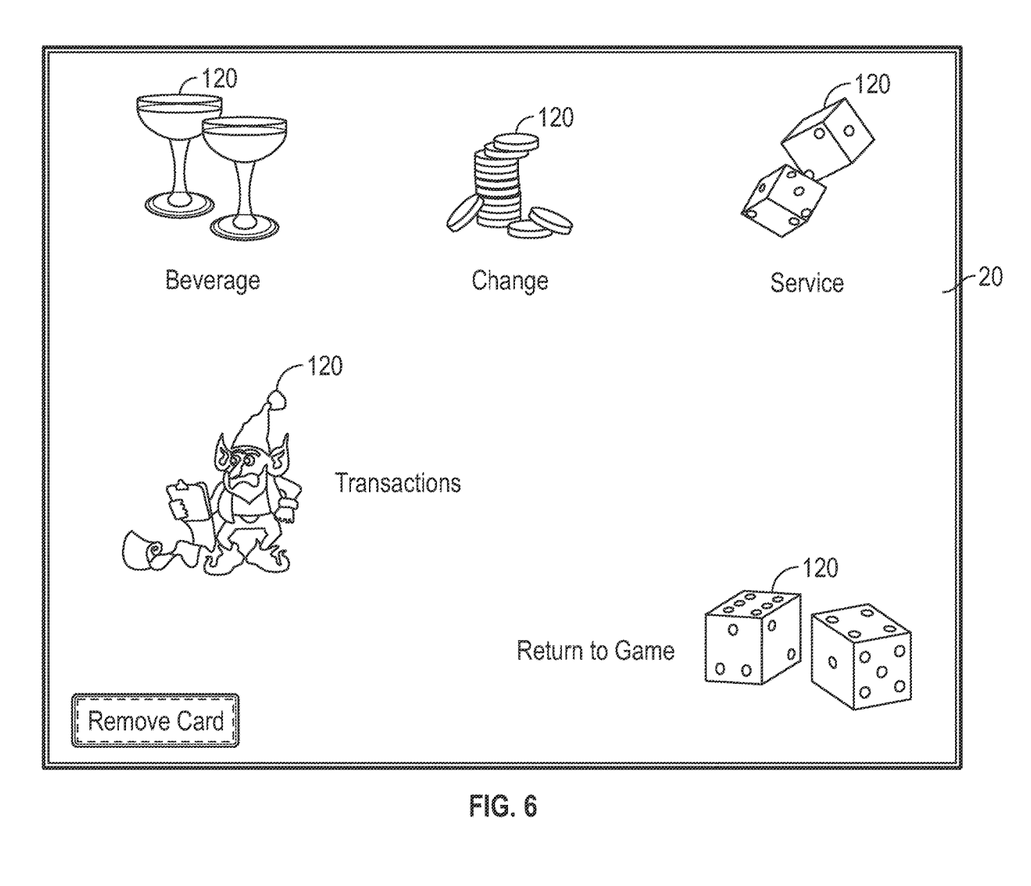
FIG. 6 illustrates a front view of the display screen of the gaming device in FIG. 5, while a full screen player services interface is activated.
Figure 7:
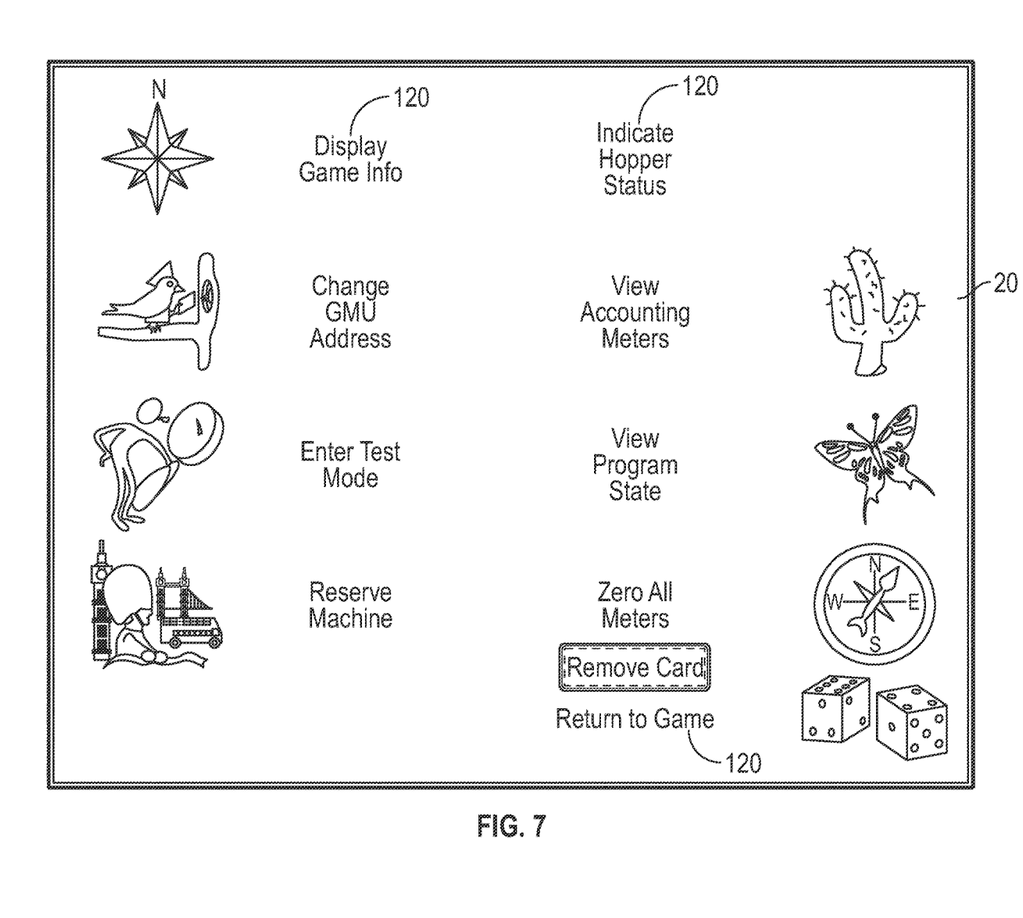
FIG. 7 illustrates a front view of the display screen of the gaming device in FIG. 5, while a full screen employee systems interface is activated.

Referring now to FIGS. 5-7, in another embodiment, the display screen 40 includes a touchscreen button 118 that activates a full screen systems interface 20 when selected. (In some embodiments insertion of an identification card is also required.) In this embodiment, the game logic process 34 in the IOP 80 recognizes when this touchscreen button 118 on the display screen 40 is selected and, in response, relinquishes control of the display screen 40 to the Pentium class processor 90, thus deactivating (or minimizing) the gaming interface 30 and activating (or maximizing) the systems interface 20. Meanwhile, the processor 90 running the systems interface 20 takes control of the display screen 40 and provides a means of directly accessing the service and system information 14 from the system network 18 using touchscreen data entry. This is accomplished without involving the game logic process 34 in the IOP 80. FIG. 5 shows the display screen 40 of the gaming device 50 with only the full screen gaming interface 30 activated. FIG. 6 shows the display screen 40 of the gaming device 50 with only the full screen player services interface 20 activated. FIG. 7 shows the display screen 40 of the gaming device 50 with only the full screen employee systems interface 20 activated.

In one exemplary embodiment of the display and input system 10 that utilizes a card reader (or other identification technique) to recognize a particular player, the systems interface 20 displays a textual greeting to that player, for example, "Welcome, Mr. Smith!" in response to recognizing Mr. Smith's identification card. In some embodiments, as shown in FIG. 6, the systems interface 20 also has touchscreen icon buttons 120 including, by way of example only, and not by way of limitation, "Beverages," "Change," "Services," "Transactions," and "Return to Game." Further, each of these icon buttons 120, when selected, launches a new full screen display within the systems interface 20 to display to the player. For example, in one embodiment, when the "Transactions" icon buttons 120 is selected, a new screen is activated that includes the text, "Mr. Smith, Account Balance: Bonus Points=1200, Player Funds=$150, Available Credit=$850, Casino Matching Funds Available=$25," as well as the "Return to Game" icon buttons 120. As a further example, when the player selects a "Cashless Withdraw" button in other embodiment, a new screen is activated that includes a touchscreen keypad and the textual question, "How much do you want?" as well as "Enter," "Clear," and "Back" buttons. This interface may also include an "Information" button that, when selected, launches a new screen within the systems interface 20 that provides answers to frequently asked questions and other useful information. Moreover, the interface may include a "History" button that, when selected, launches a new screen within the systems interface 20 that provides a history log of all transactions and other actions performed on that gaming device 50.

As discussed above, one disclosed embodiment of the display and input system 10, as shown in FIG. 1, uses a game platform 70 as its foundation. The game platform 70 itself, is a highly advantageous system, that enables casino owners to draw off of the large library of casino game functions available in a traditional master processing unit (MPU) stand-alone platform, while adding the graphics and sound capabilities of a personal computer. Current stand-alone MPU systems also contain drivers for all types of casino games (slot, poker, keno, etc.). The IOP 80 in the game platform 70 is derived from a traditional MPU stand-alone platform, and provides access to the above described library of casino game functions and drivers for these casino games.

However, the PC industry has a large number of tools that can create graphics and sound very efficiently. For this and other reasons, the game platform 70 includes a Pentium class processor 90 running an operating system that accepts PC sound and graphics content. In one embodiment, the operating system in the processor 90 of the game platform 70 is Microsoft NT embedded. The game platform 70 combines the strengths of a traditional stand-alone MPU game engine with the audio and visual capabilities that are available in the PC industry. Thus, the game platform 70 enables PC content to be used directly on a game platform vis-à-vis a Windows operating system environment (or other suitable graphic user interface (GUI)).

The IOP 80 in the game platform 70 differs from the traditional stand-alone MPU architecture in several ways. For example, in the game platform 70 the contents of the graphics chips are not located in the IOP 80 (as they are in the MPU), but rather are replaced by enhanced graphics and animations stored on the CD-ROM. Additionally, in the game platform 70 the contents of sound chips are not located on the IOP 80 (as they are in the MPU), but rather they are replaced by enhanced sound files stored on the CD-ROM. The Pentium class processor 90 has presentation software for displaying the graphics and sound upon request from the game logic process 34 within the IOP 80.

In one embodiment, the game platform 70 utilizes an "EPROM and CD-ROM paired" design. In this configuration, the IOP 80 contains the game logic 34, random number generators (RNG), and core mains and personalities. In addition, the IOP 80 does all of the input/output activities for driving hoppers, buttons, lights, acceptors, etc. These functions are all contained on EPROM and are verifiable by traditional IC testing techniques. The BIOS+ on the Pentium motherboard verifies the CD-ROM before loading any properties on to the Pentium RAM. The CD-ROM contains the operating system, display, and audio and graphics programs.

One example of the media flow proceeds in the following sequence. (1) Verify the boot chip using traditional IC verification techniques. (2) The power comes up. The BIOS+ runs a self-verification on its own code. (3) The processor 90 begins executing the BIOS+. (4) The BIOS+ comes up far enough to read the CD-ROM. Verification is run on the entire CD-ROM contents using a SHA-1 algorithm contained with in the BIOS+. (5) A private key encrypted SHA-1 value, located in a secure location on the CD-ROM, is decrypted with the public key and algorithm contained on the BIOS+. (6) The results of the SHA-1, and now decrypted SHA-1 value, are compared. A match allows the operating system, program files, graphics, and audio to be loaded into the Pentium's RAM from the CD-ROM. (7) Since the IOP 80 can boot faster from EPROM, the 10P waits to hear that the Pentium has booted and loaded all needed software components into RAM. (8) The IOP 80 then checks the Pentium software levels using the same scheme used to match game driver levels to personality chip requirements. If the versions are acceptable, the IOP 80 confirms that the game personality contained in the EPROM matches the game personality on the CD-ROM. (9) The game then proceeds, driven by the IOP 80. Thus, the game personality contained in the EPROM on the IOP 80, and the game personality on the Pentium CD-ROM, are a matched set. If the two do not match, a fatal tilt results, rendering the game inoperable. This also means that the regulators must approve both the EPROM and the CD-ROM for every game released for distribution and approval.

In another embodiment, the game platform 70 utilizes a "CD-ROM controlled" design. In this configuration, with the introduction of the BIOS+ driven SHA-1 CD-ROM verification, the game personality contents are placed only on the CD-ROM, and not on an EPROM located in the IOP 80. This design provides the advantage of reducing the testing and distribution workload for gaming regulators. By utilizing this configuration, only a CD-ROM needs to be tested and released for new game content. This also eliminates the potential for compatibility mismatches between a personality chip in an EPROM of the IOP 80, and in the CD-ROM contents associated with the Pentium class processor 90. Moreover, this "CD-ROM controlled" design also eases the need for compatibility checks between the IOP 80 and Pentium class processor 90. Existing game driver level checks between the IOP 80 mains and the game personalities remain in place and are equally effective in this RAM-based personality design. Once the Pentium class processor 90 boots and successfully verifies the contents of the CD-ROM, a binary image of the game personality is downloaded from the CD-ROM to a RAM chip located within the IOP 80. This RAM chip occupies the same socket that the game personality EPROM did in the IOP 80 in the "paired" design game platform 70.

In the game platform 70, since there are two motherboards, the IOP 80 and Pentium 90, each must have an operating system. The IOP 80 may use VRTX as its operating system. VRTX is a reliable, real-time operating system with multi-tasking capabilities that has been used in the gaming environment for many years. The Pentium class motherboard 90 may use Microsoft Windows NT embedded. NT embedded is particularly effective since many tools and developers are available for producing creative content on Windows-style platforms. However, other operating systems could also be selected in other embodiments, depending on many factors, including the desired graphic user interface (GUI).

Windows NT embedded differs from standard desktop operating systems, such as Windows 98 and Windows NT, which require a hard drive. These operating systems make use of a swap file to move programs and data between RAM and a hard disk. However, NT embedded eliminates the need for a swap file. NT embedded is customizable in this regard, allowing the swap file size to be set to zero so that no writable mass storage device is required. Further, NT embedded may be modified and compiled with only those components required to run a particular game (or games). In other words, there are no additional drivers or services provided. Typically, there is no GUI interface, keyboard, mouse drivers, or TCP/IP stack (or networking capabilities whatsoever). In one embodiment, this modified version of NT embedded is completely stand-alone and provides none of the traditional accessing "handles."

Referring now to security requirements, a primary objective of the security design is to satisfy all security requirements and gaming jurisdiction directives. The relevant directives require that the verification information and the verification code reside on a "conventional ROM device." However, pursuant to the proposed amendments to Gaming Regulations, a "conventional ROM device" may include FLASH memory components provided that they cannot be altered while installed in a gaming device. To satisfy these directives, the verification algorithm in the game platform 70 resides on a conventional ROM device, secured within the Pentium/IOP assembly.

Figure 8:
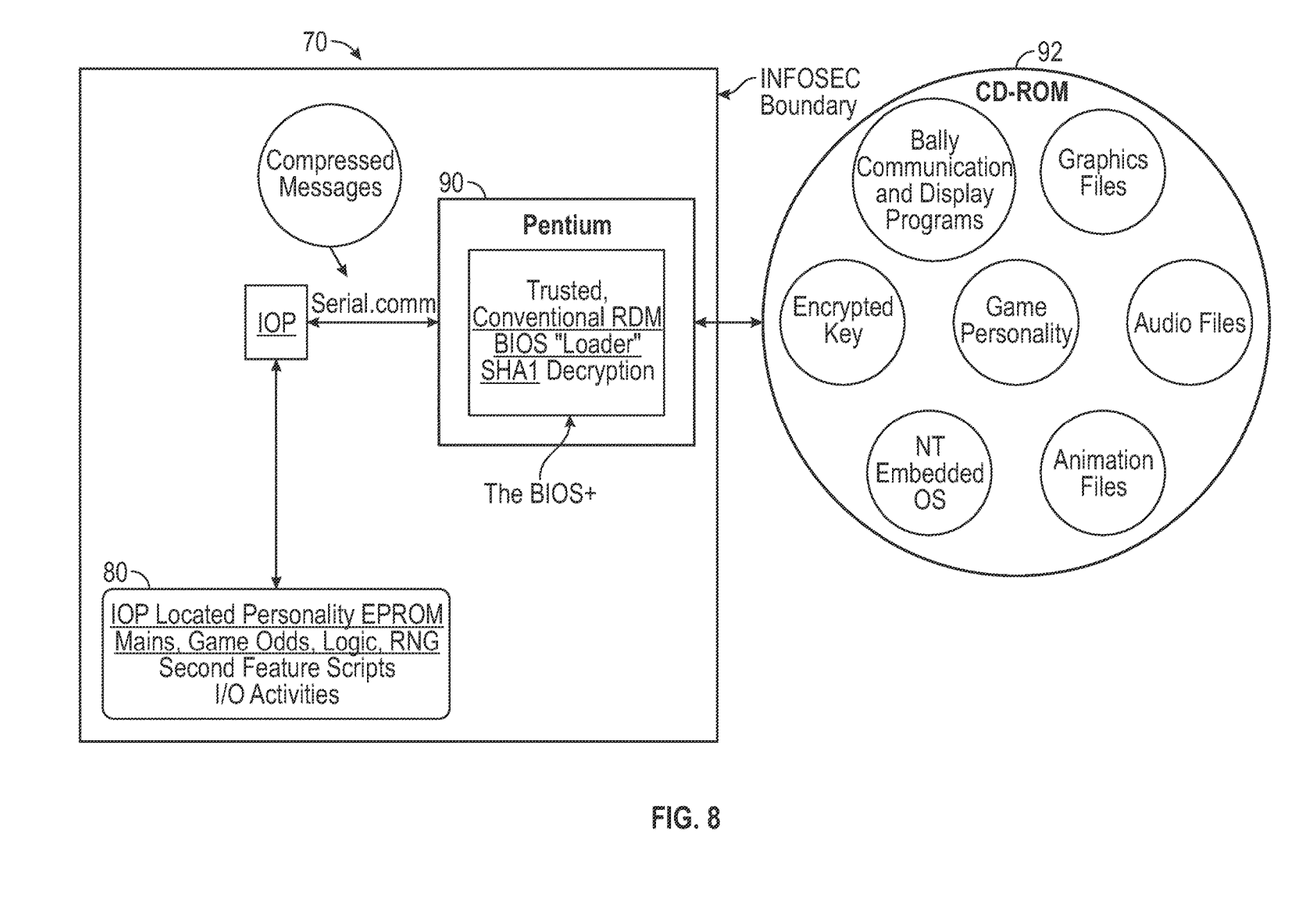
FIG. 8 illustrates a relational diagram of the security architecture of a display and input system that shows the information security boundary logically dividing the critical game security components inside of the boundary from the non-critical components outside of the boundary.

The security architecture logically divides the game security components inside and outside of an information security (INFOSEC) boundary. The critical game security components are located on the inside the INFOSEC Boundary, as shown in FIG. 8. On the secure inside of the INFOSEC Boundary, the game platform 70 includes the IOP 80 and the Pentium class processor 90, connected by a serial line. In one embodiment, the IOP portion 80 of the design is based on a Motorola 68332 and EPROMs on a VRTX operating system. On the Pentium portion 90, the BIOS+ chip plugs into the Pentium motherboard and is physically secured within the Pentium assembly chassis, according to another aspect of one embodiment. The conventional ROM device is socketed into the Pentium motherboard 90 and can be covered with a tamper-evident material. The CD-ROM assembly 92 is logically outside of the INFOSEC boundary. The CD-ROM assembly 92 contains a commercial off-the-shelf CD read-only reader and the game CD-ROM. The game CD-ROM assembly 92 contains a custom version of NT embedded as the operating system, presentation programs, audio content, and video content.

The game platform 70 provides a secure boot and initial CD-ROM verification. The EPROM verification software resides within the IOP 80. The verification software verifies all EPROMs on the IOP board 80 (i.e., mains and personalities) upon application of power to the game platform 70. Next, after the application of power to the platform, the BIOS+ performs a self-verification on all of its code. Once satisfactorily completed, the Pentium class board 90 begins executing code from the BIOS+ contained in the conventional ROM device. This process verifies the conventional ROM device and detects any substitution of the BIOS+.

Upon boot-up of the Pentium, the BIOS+ executes a SHA-1 verification of the entire CD-ROM. The digital signature is calculated and compared with an encrypted signature stored in a secure location on the CD-ROM using the RSA private/public key methodology. If the signatures compare, the BIOS+ allows the modified NT embedded operating system to boot from the CD-ROM, followed by the game presentation software. After verification of the total CD-ROM, the modified (and now verified) NT embedded operating system is loaded from the CD-ROM into the Pentium RAM. Next, display programs and content are verified, before being loaded into the IOP RAM to be executed for normal game operation.

The game platform 70 performs many verification processes during boot-up and operation. Each game personality EPROM image on the IOP 80 is compared with those on the accompanying CD-ROM. Further, verification of all files on the CD-ROM is conducted by an algorithm that originates on the BIOS+. The IOP board 80 informs the Pentium 90 of any tilts that occur. Additionally, the IOP 80 initiates re-verification of the CD-ROM. Moreover, on the EPROM-controlled IOP 80, memory is continuously tested in order to immediately catch any changes.

The technologic improvements from utilizing the display and input system 10 are numerous. These advantages include, by way of example only, and not by way of limitation, simplification of the use and appearance of the systems interface 20 by integrating the interface 20 into the display screen 40; providing fonts and icons which are larger and more aesthetically appealing; providing special services to players, (e.g., multiple languages, assistance for handicapped individuals); lowering overall system costs by eliminating hardware components; lowering maintenance costs as a result of the fewer hardware components; facilitating interactive uses of the systems interface 20 and game interface 30; providing the ability to customize the "look and feel" of the systems interface 20 for players and casino employees; facilitating the efficiency of modifying the systems interface 20; and allowing system features and components to be modified without affecting the game design or logic.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the disclosed embodiments without following the example embodiments and applications illustrated and described herein, and without departing from the true spirit and scope of disclosed embodiments, which is set forth in the following claims.

What is claimed is:

1. A system for integrating system functions with gaming functions via a video touch screen display of a gaming device, the system comprising:
a plurality of input devices including:
(a) an acceptor of a first physical item associated with monetary funds; and
(b) a button actuatable to cause an initiation of a payout associated with a credit balance;
at least one gaming device memory device storing a gaming program;
a gaming interface in communication with at least a first processor, the gaming interface incorporated within the video touch screen display of the gaming device, the gaming interface displaying wagering game content received from the first processor and receiving first inputs delivered to the first processor to perform the gaming functions associated with the wagering game content; and
an interactive systems interface in communication with at least a second processor, the interactive systems interface incorporated within the video touch screen display of the gaming device, the interactive systems interface including a systems message area displaying interactive non-gaming system content received from a system network via the second processor to a player via the video touch screen display of the gaming device while the wagering game content is concurrently displayed; the interactive systems interface enabling requests to be input into the system network from the interactive systems interface through the gaming device by the player while the wagering game content is concurrently displayed.

2. The system of claim 1, wherein the interactive systems interface is activated by insertion of an identification card into a card reader of the gaming device.

3. The system of claim 1, wherein the interactive systems interface includes a player services interface and an employee systems interface, the player services interface being activated by insertion of an authorized player identification card into a card reader of the gaming device, the player services interface providing a player with access to service features.

4. The system of claim 1, wherein the interactive systems interface includes a player services interface and an employee systems interface, the employee systems interface being activated by insertion of an authorized employee identification card into a card reader of the gaming device, the employee systems interface providing an employee with access to system information.

5. The system of claim 1, further including calibration software that enables calibration of the system content on the video touch screen display.

6. The system of claim 1, wherein the interactive systems interface is activated in response to a touch input into a small region of the video touch screen display.

7. The system of claim 1, further comprising a message section on the video touch screen display, wherein the message section of the video touch screen display is allocated for showing messages to a player of the gaming device.

8. The system of claim 1, wherein the message section of the video touch screen display is dedicated to control by the system network via the second processor and is free from control by the first processor.

9. The system of claim 1, wherein the interactive systems interface utilizes touchscreen technology for inputting and accessing system information in the systems network.

10. A system for integrating system functions with gaming functions via a video touch screen display of a gaming device, the system comprising:
- a plurality of input devices including:
  - (a) an acceptor of a first physical item associated with monetary funds; and
  - (b) a button actuatable to cause an initiation of a payout associated with a credit balance;
- at least one gaming machine memory device storing a gaming program;
- a gaming interface in communication with at least a first processor, the gaming interface incorporated within the video touch screen display of the gaming device, the gaming interface displaying wagering game received from the first processor, the system enabling a player to view and participate in the wagering game through the gaming interface; and
- an interactive systems interface in communication with at least a second processor, the interactive systems interface incorporated within the video touch screen display of the gaming device, the interactive systems interface including a systems message area displaying interactive non-gaming system content received from a system network via the second processor to a player via the video touch screen display of the gaming device while the wagering game content is concurrently displayed,
- the interactive systems interface enabling requests to be input into the system network from the interactive systems interface through the gaming device by the player while the wagering game content is concurrently displayed.

11. The system of claim 10, wherein the interactive systems interface is activated by insertion of an identification card into a card reader of the gaming device.

12. The system of claim 10, wherein the interactive systems interface includes a player services interface and an employee systems interface, the player services interface being activated by insertion of an authorized player identification card into a card reader of the gaming device, the player services interface providing a player with access to service features.

13. The system of claim 10, wherein the interactive systems interface includes a player services interface and an employee systems interface, the employee systems interface being activated by insertion of an authorized employee identification card into a card reader of the gaming device, the employee systems interface providing an employee with access to system information.

14. The system of claim 10, further including calibration software that enables calibration of the system content on the video touch screen display.

15. The system of claim 10, wherein the player services interface provides player access to service features including ordering beverages and receiving change.

16. The system of claim 10, wherein the employee systems interface provides employee access to system information selected from a group including game information, game monitoring unit address, test mode, machine reservation, hopper status, account meters, program state, and a meter zeroing function.

17. The system of claim 10, wherein the interactive systems interface is activated in response to a touch input into a small region of the video touch screen display.

18. The system of claim 10, further comprising a message section on the video touch screen display, wherein the message section of the video touch screen display is allocated for showing messages to a player of the gaming device.

19. The system of claim 10, wherein the message section of the video touch screen display is dedicated to control by the system network via the second processor and is free from control by the first processor.

20. The system of claim 10, wherein the interactive systems interface utilizes touchscreen technology for inputting and accessing system information in the systems network.

* * * * *